(12) United States Patent
Chen

(10) Patent No.: US 6,700,777 B2
(45) Date of Patent: Mar. 2, 2004

(54) COMPUTER ENCLOSURE WITH DRIVE BRACKET

(75) Inventor: Yun Lung Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 28 days.

(21) Appl. No.: 10/003,576

(22) Filed: Nov. 29, 2001

(65) Prior Publication Data

US 2003/0099089 A1 May 29, 2003

(51) Int. Cl.[7] ................................................ G06F 1/16
(52) U.S. Cl. ..................... 361/685; 361/683; 312/223.1; 312/223.2
(58) Field of Search ................................ 361/683–686, 361/724; 312/223.1, 223.2, 263; 248/7

(56) References Cited

U.S. PATENT DOCUMENTS

| | | | |
|---|---|---|---|
| 5,450,285 A | * | 9/1995 | Schlemmer ................ 361/724 |
| 5,600,538 A | * | 2/1997 | Xanthopoulos ............. 361/683 |
| 5,748,442 A | * | 5/1998 | Toor ........................... 361/685 |
| 6,158,699 A | * | 12/2000 | Boe ........................... 248/27.1 |
| 6,392,892 B1 | * | 5/2002 | Sobolewski et al. ........ 361/724 |

* cited by examiner

Primary Examiner—Darren Schuberg
Assistant Examiner—Anthony Q. Edwards
(74) Attorney, Agent, or Firm—Wei Te Chugn

(57) ABSTRACT

A computer enclosure (100) includes a cage (50) and a drive bracket (10). The cage includes a base wall (60), and two side walls (62) extending upwardly from the base wall. A box-shaped supporting portion (64) is formed from a front edge of the base wall. A top portion of a front edge of each side wall extends inwardly and rearwardly to fold back over itself and form a fastening device (66). Each fastening device includes two symmetrically opposing L-shaped portions (68), and a sliding space (69). A pair of L-shaped latches (20) is outwardly stamped from each of opposite side plates (14) of the drive bracket, for being received in the sliding space of the corresponding fastening device. A plurality of apertures (74) is defined in the supporting portion in alignment with a plurality of holes (24) of the drive bracket, for extension of screws therethrough.

4 Claims, 3 Drawing Sheets

COMPUTER ENCLOSURE WITH DRIVE BRACKET

BACKGROUND OF THE INVENTION

1. Field of the Invention

The present invention relates to computer enclosures, and in particular to computer enclosures having fastening devices for readily securing drive brackets to the enclosures and readily detaching the drive brackets from the enclosures.

2. Related Art

When a conventional computer is assembled, a drive bracket is firstly mounted in a computer enclosure. Then data storage devices such as a hard disk drive (HDD), a floppy disk drive (FDD) and a compact disk read only memory (CD-ROM) drive are attached to the drive bracket.

Users and manufacturers require the drive bracket to be installed in the computer enclosure quickly and easily. A drive bracket is typically secured to a computer enclosure by riveting or by using a number of screws. However, such means are cumbersome and time-consuming. Extra components such as rivets or screws increase costs. Furthermore, during assembly, extra operating space for attaching the rivets or screws is required.

Computers are continually being made smaller and smaller. All space inside a computer enclosure needs to be used, such as space under a drive bracket. Electronic components located under the drive bracket need to be maintained or replaced from time to time, requiring removal of the drive bracket. Therefore, easy removal of the drive bracket is required.

Examples of conventional computer enclosures are disclosed in Taiwan Patents Nos. 296079, 296078 and 276790, and U.S. Pat. No. 5,447,367. Unfortunately, the computer enclosures disclosed therein have a number of shortcomings. In particular, when users want to access electronic components under drive brackets, the drive brackets must still be unscrewed. This is unduly laborious and inconvenient.

Thus, a computer enclosure which overcomes the above-mentioned problems is desired.

BRIEF SUMMARY OF THE INVENTION

Accordingly, an object of the present invention is to provide a computer enclosure having fastening devices for readily securing a drive bracket to the enclosure and readily detaching the drive bracket from the enclosure.

Another object of the present invention is to provide a computer enclosure having fastening devices which firmly fix a drive bracket to the enclosure.

To achieve the above-mentioned objects, a computer enclosure comprises a cage and a drive bracket. The cage comprises a base wall, and two side walls extending upwardly from the base wall. A box-shaped supporting portion is formed from a front edge of the base wall. A top portion of a front edge of each side wall extends inwardly and rearwardly to fold back over itself and form a fastening device. Each fastening device includes two symmetrically opposing L-shaped portions, and a sliding space. A pair of L-shaped latches is outwardly stamped from each of opposite side plates of the drive bracket, for being received in the sliding space of the corresponding fastening device. A plurality of apertures is defined in a vertical wall of the supporting portion in alignment with a plurality of holes of tabs of the drive bracket, for extension of screws therethrough.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
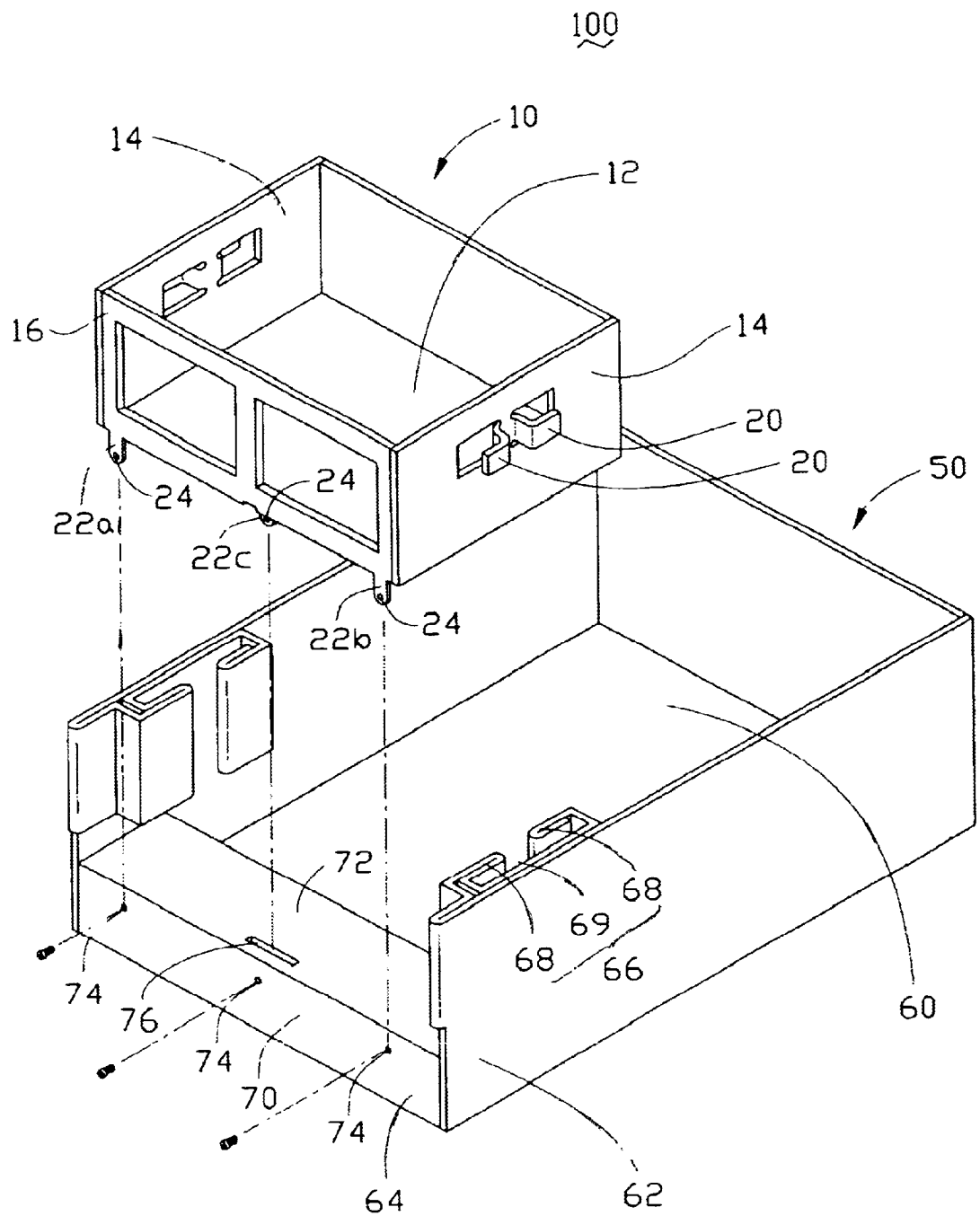
FIG. 1 is an exploded perspective view of a computer enclosure in accordance with a preferred embodiment of the present invention.

Referring to FIG. 1, a computer enclosure 100 in accordance with a preferred embodiment of the present invention includes a cage 50 and a drive bracket 10. The cage 50 has a base wall 60, and two side walls 62 extending upwardly from two lateral sides of the base wall 60. The drive bracket 10 is attached to the cage 50 by fastening devices 66 of the cage 50.

A front edge of the base wall 60 of the cage 50 extends upwardly and rearwardly to form a generally box-shaped supporting portion 64. The supporting portion 64 includes a vertical wail 70 extending upwardly from the front edge of the base wall 60, and a horizontal wall 72 extending perpendicularly and rearwardly from an upper end of the vertical wall 70. Three spaced apertures 74 are defined in the vertical wall 70, in horizontal alignment with each other. A slot 76 is defined in a middle portion of the horizontal wall 72 near a junction of the vertical wall 70 and the horizontal wall 72, and corresponding to a middle aperture 74 of the three apertures 74. A top portion of a front edge of each side wall 62 extends inwardly and rearwardly to fold back over itself, and further folds to form a corresponding fastening device 66. Each fastening device 66 includes two symmetrically opposing first and second L-shaped portions L-shaped portion 68 internally extends from a front end of the corresponding side wall 62 and the second portion 68 further extends from the first L-shaped portion 68. The two L-shaped portions 68 and the corresponding side wall 62 cooperatively define a T-shaped sliding space 69 therebetween.

The drive bracket 10 includes a bottom plate 12, two opposing side plates 14 extending upwardly from lateral edges of the bottom plate 12, and a front plate 16 extending upwardly from a front edge of the bottom plate 12. Two tabs 22a, 22b respectively depend from opposite sides of a bottom edge of the front plate 16. A third tab 22c depends from a front portion of the bottom plate 12, corresponding to the slot 76 of the horizontal wall 72 of the cage 50. A hole 24 is defined in each tab 22a, 22b, 22c. A pair of symmetrically opposite L-shaped latches 20 is outwardly stamped from each side plate 14. Each pair of L-shaped latches 20 cooperatively forms a T-shape configuration, for being received in the T-shaped sliding space 69 of the corresponding fastening device 66.

Figure 2:
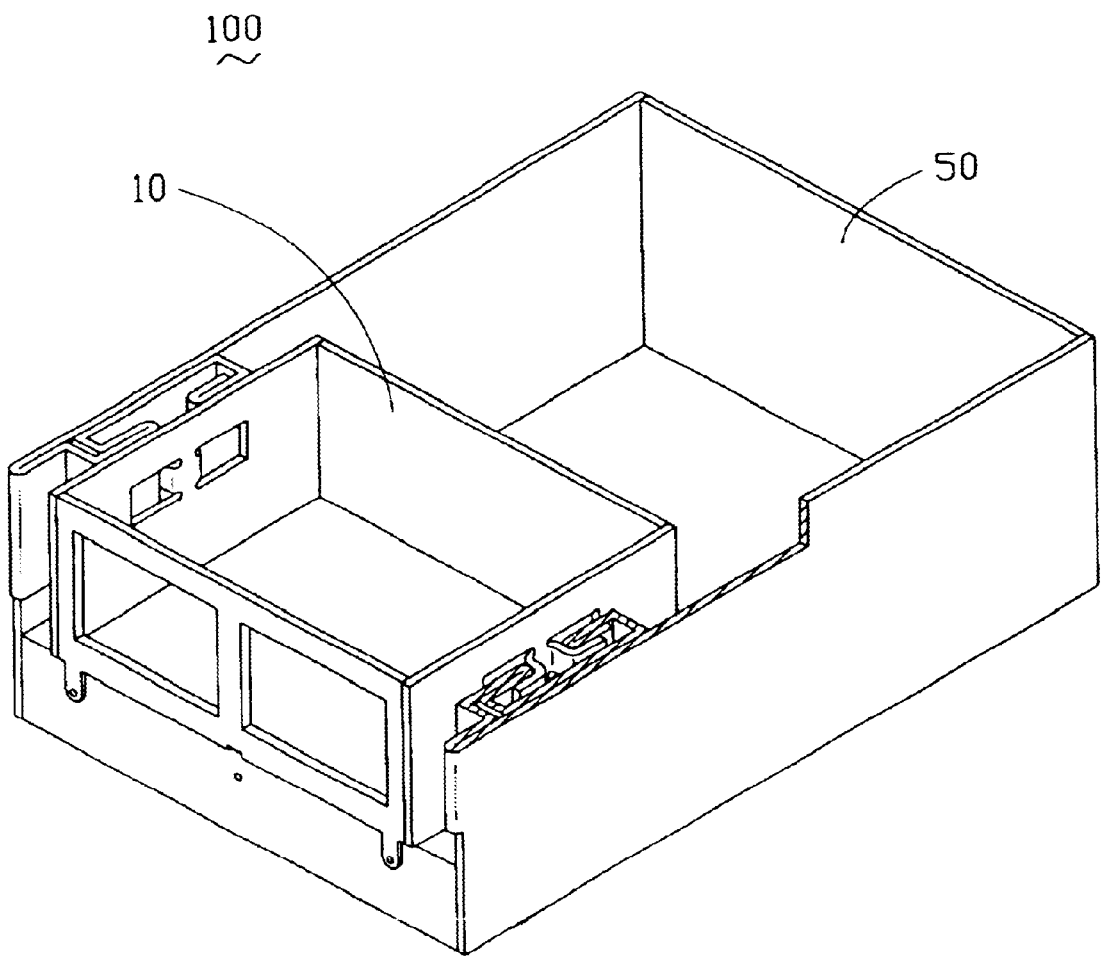
FIG. 2 is an assembled view of FIG. 1, with part of a cage of the computer enclosure cut away to better illustrate fastening structures of the computer enclosure.

Referring also to FIG. 2, in assembly, the L-shaped latches 20 of the drive bracket 10 are received in the sliding spaces 69 of the fastening devices 66 of the cage 50. The L-shaped latches 20 are slid downwardly along the sliding spaces 69 until the bottom plate 12 of the drive bracket 10 abuts against the horizontal wall 72 of the cage 50. The third tab 22c of the drive bracket 10 is received in the slot 76 of the horizontal wall 72. The holes 24 of the tabs 22a, 22b, 22c are in alignment with the corresponding apertures 74 of the vertical wall 70 of the cage 50. Three screws (not labeled) are used to secure the drive bracket 10 to the cage 50. Two of the three screws are respectively extended through two of the holes 24 at opposite sides of the drive bracket 10. The two screws respectively engage in the corresponding apertures 74 at opposite sides of the cage 50. One of the three screws is extended through the corresponding middle aperture 74 to engage in the hole 24 of the tab 22c.

In disassembly, the three screws are removed. The drive bracket 10 is then easily slid up and out from the cage 50.

Figure 3:
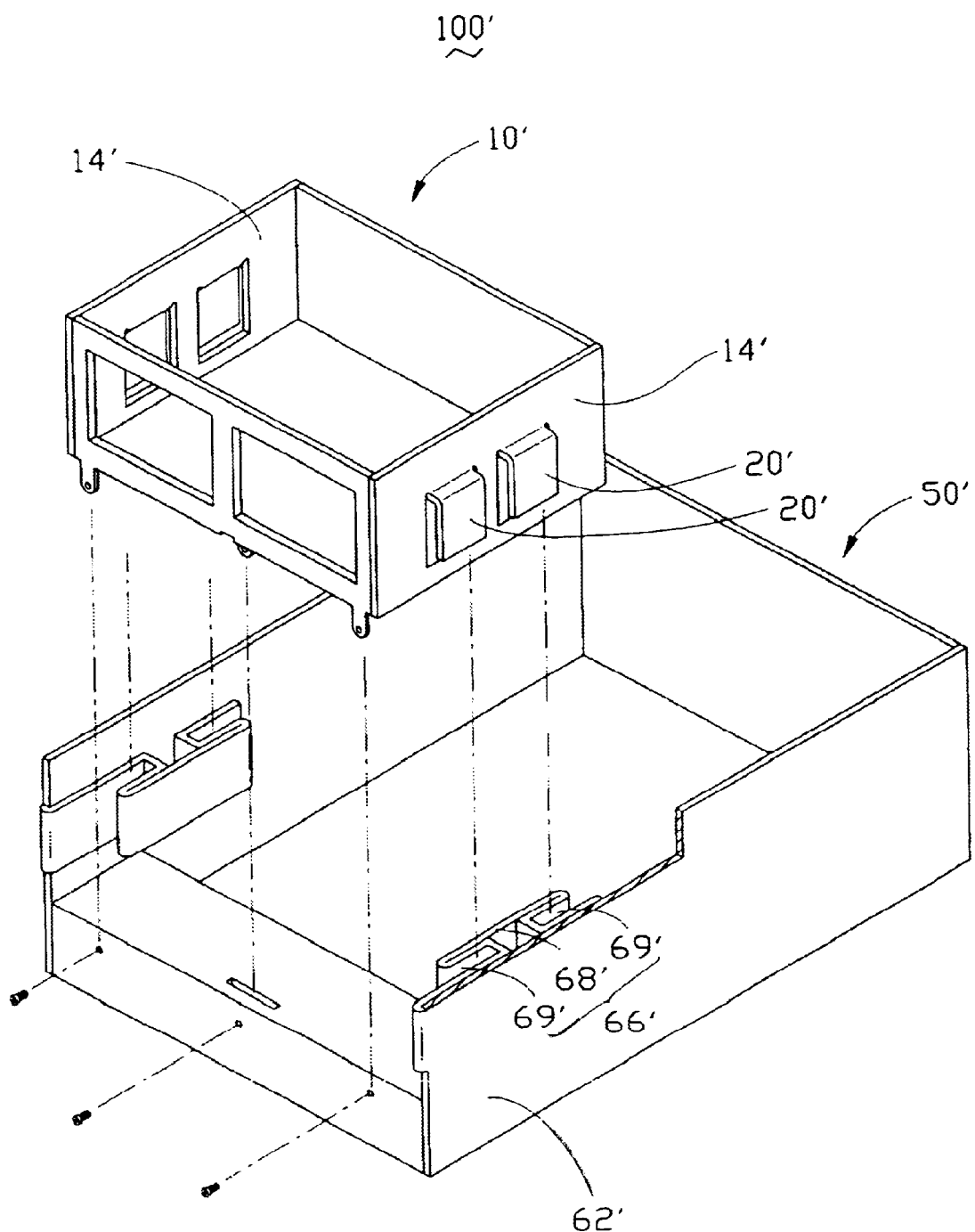
FIG. 3 is an exploded perspective view of a computer enclosure in accordance with an alternative embodiment of the present invention.

FIG. 3 shows a computer enclosure 100' in accordance with an alternative embodiment of the present invention. Most of the structures of the computer enclosure 100' are the same as those of the computer enclosure 100 of the first preferred embodiment. Therefore, detailed description of such same structures is omitted herefrom. An upper portion of a front edge of each side wall 62' of a cage 50' extends inwardly and rearwardly to fold back over itself, and further folds to form a corresponding fastening device 66'. Each fastening device 66' is folded to form a generally T-shaped configuration 68'. The T-shaped configuration 68' comprises two symmetrically contrary L-shaped portions (not labeled). One of the L-shaped portions extends from a front edge of corresponding side wall 62' and the other one of the L-shaped portions further extends from the one of the L-shaped portions. The T-shaped and the corresponding side wall 62' cooperatively define two sliding spaces 69' therebetween. A pair of L-shaped latches 20' is stamped outwardly and downwardly from each of two side plates 14' of a drive bracket 10'. In assembly, the L-shaped latches 20' are slidably received in the sliding spaces 69' of the fastening devices 66'. Three screws (not labeled) secure the drive bracket 10' to the cage 50', in like manner to the first preferred embodiment.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure, comprising:
a base wall having a supporting portion for supporting a drive bracket, an aperture defined in the supporting portion, a slot defined in the supporting portion rearwardly of and in alignment with the aperture and adapted to receive a tab depending from the drive bracket therein, the aperture being adapted for extension of a screw therethrough to engage ins hole defined in the tab; and two side walls extending upwardly from the base wall, each of the side walls having a fastening device, each of the fastening devices forming a sliding space for slidably receiving a stamped portion of a corresponding side plate of a drive bracket thereby fastening the drive bracket to the two side walls.

2. The computer enclosure as described in claim 1, wherein a plurality of said apertures is further defined in the supporting portion in alignment with a plurality of the holes defined in a plurality of the tabs depending from the drive bracket, for extension of screws therethrough.

3. A computer enclosure assembly comprising:
a cage having a pair of opposite side walls in a parallel relation;
a pair of fastening devices respectively integrally extending from front edges of said side walls in a backwardly folded manner and located inside of said corresponding side walls under an overlapped condition, respectively, and Opposite to each other, each of said fasteners experiencing several bends to independently form a pair of opposite sliding spaces without involvement of the corresponding side wall aside; and
a drive bracket located in the cage and including a pair of opposite side plates each with a pair of opposite latches thereon; wherein
said pair of opposite latches are snugly received in the corresponding sliding spaces, respectively.

4. The assembly as described in claim 3, wherein said fastening device is smaller than the corresponding side wall in a vertical direction along said front edge.

* * * * *